US007565492B2

(12) United States Patent  
Mckeen et al.

(10) Patent No.: US 7,565,492 B2
(45) Date of Patent: Jul. 21, 2009

(54) METHOD AND APPARATUS FOR PREVENTING SOFTWARE SIDE CHANNEL ATTACKS

(75) Inventors: Francis X. Mckeen, Portland, OR (US); Leena K. Puthiyedath, Beaverton, OR (US); Ernie Brickell, Portland, OR (US); James B. Crossland, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 288 days.

(21) Appl. No.: 11/513,871

(22) Filed: Aug. 31, 2006

(65) Prior Publication Data

US 2008/0059711 A1 Mar. 6, 2008

(51) Int. Cl.
*G06F 12/00* (2006.01)
(52) U.S. Cl. ..................................... 711/129; 711/133
(58) Field of Classification Search ................. 711/129, 711/133
See application file for complete search history.

(56) References Cited

U.S. PATENT DOCUMENTS

| 6,094,729 A * | 7/2000 | Mann .......................... 714/25 |
| 6,157,986 A * | 12/2000 | Witt ............................ 711/118 |
| 6,295,580 B1 * | 9/2001 | Sturges et al. ................ 711/129 |
| 2004/0268094 A1 * | 12/2004 | Abdallah et al. ............. 712/221 |

FOREIGN PATENT DOCUMENTS

EP           0856797 A1        8/1998

OTHER PUBLICATIONS

Ostvik, Dag A., et al., "Cache Attacks And Countermeasures: The Case of AES (Extended Version)", (Retrieved on Sep. 13, 2008) http://www.wisdom.weizmann.ac.il/{tromer/papers/cache.pdf, Department of Computer Science and Applied Mathematics, Weizmann Institute of Science, Rehovot, Isarael, (Nov. 20, 2005), 25 pages.
Page, D., "Partitioned Cache Architecture As A Side-Channel Defence Mechanism", (Retrieved on Jan. 20, 2008), http://citeseer.ist.psu.edu/chache/papers/cs2/433/http:zSzzSzeprint.iacr.orgzSz2005zSz280.pdf/page05partitioned.pdf, Department of Computer Science, University of Bristol, Merchant Venturers Buildings, Woodland Road, Bristol, BS8 IUB, United Kingdom, (Aug. 2005), pp. 1-14.

* cited by examiner

*Primary Examiner*—Reginald G Bragdon
*Assistant Examiner*—Aracelis Ruiz
(74) *Attorney, Agent, or Firm*—L. Cho (57) ABSTRACT

A method for managing a cache is disclosed. A context switch is identified. It is determined whether an application running after the context switch requires protection. Upon determining that the application requires protection the cache is partitioned. According to an aspect of the present invention, a partitioned section of the cache is completely over written with data associated with the application. Other embodiments are described and claimed.

21 Claims, 6 Drawing Sheets

METHOD AND APPARATUS FOR PREVENTING SOFTWARE SIDE CHANNEL ATTACKS

FIELD

An embodiment of the present invention relates to cache management. More specifically, an embodiment of the present invention relates to a method and apparatus for preventing software side channel attacks.

BACKGROUND

Software side channel attacks use meta information available in various system components to deduce what another process is computing. Attacks in this space have been used to find encryption keys and user passwords. Software side channel attacks may be based on inter-process leakage through the state of a CPU's memory cache. The leakage may reveal memory access patterns, which can be used for cryptanalysis of cryptographic primitives that employ data-dependent table lookups. The attacks may allow an unprivileged process to attack other processes running in parallel on the same processor, despite partitioning methods such as virtual memory protection, sandboxing, and virtualization.

One known type of software side channel attack program displaces all the data in an un-partitioned cache by writing to every location in the cache. After a context switch, a program using sensitive data, such as cryptographic keys, may displace certain lines in the cache depending on the value of the key being used in the program. After another context switch, the software side channel attack program may identify which of the lines in the cache have been displaced and determine the value of the sensitive data.

One approach used to prevent software side channel attacks required implementing a separate cache system for each logical processor. This required additional silicon area which was costly. Other approaches used to prevent software side channel attacks involved having the cache flushed after context switches and having the cache turned off. These approaches negatively impacted performance of applications which was undesirable.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
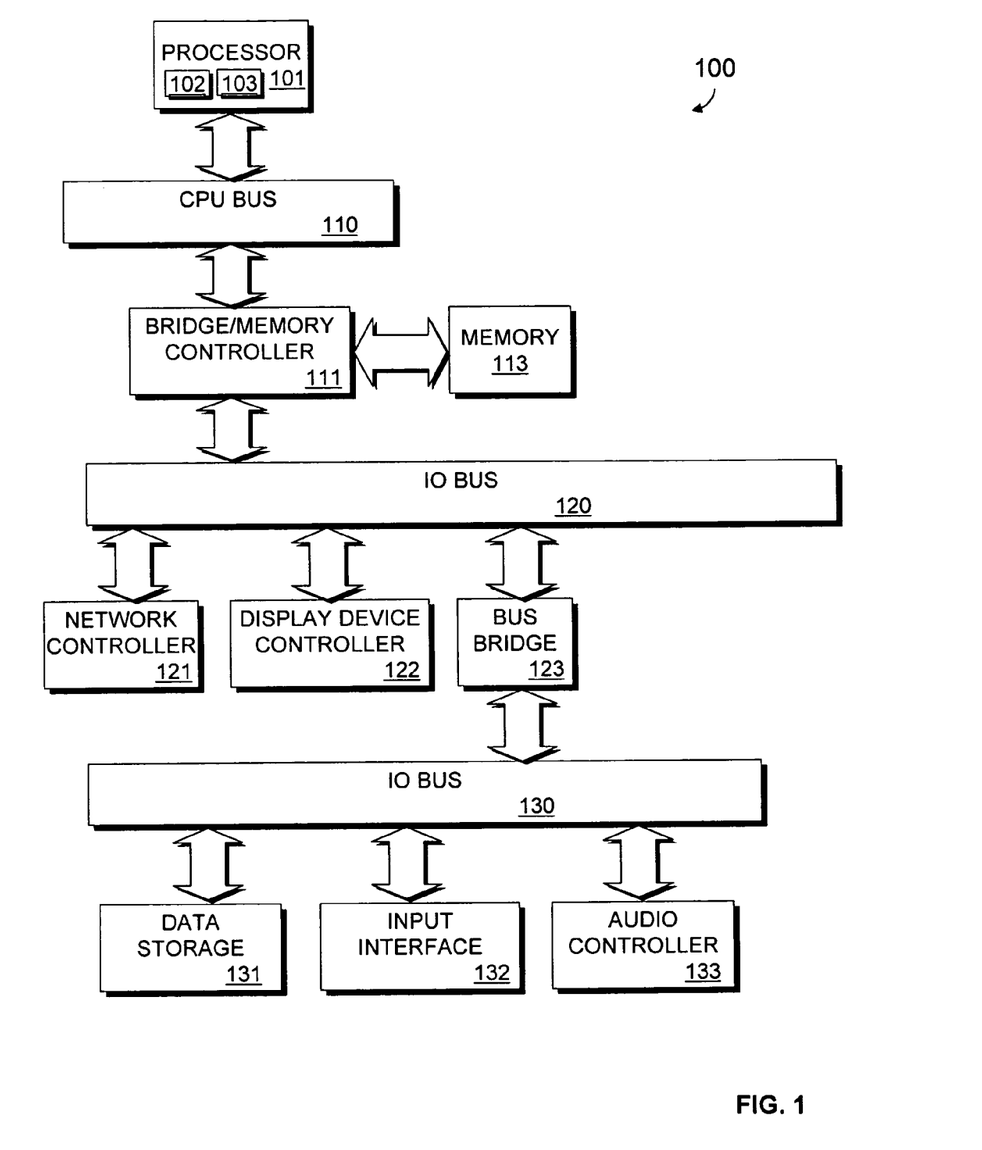
FIG. 1 illustrates an exemplary computer system implementing an embodiment of the present invention.

FIG. 1 is a block diagram of an exemplary computer system 100 implementing an embodiment of the present invention. The computer system 100 includes a processor 101 that processes data signals. The processor 101 may be a complex instruction set computer microprocessor, a reduced instruction set computing microprocessor, a very long instruction word microprocessor, a processor implementing a combination of instruction sets, or other processor device. FIG. 1 shows the computer system 100 with a single processor. However, it is understood that the computer system 100 may operate with multiple processors. According to one embodiment of the present invention, a single package may include multiple processors with hardware threaded processor cores on each chip. The processor 101 is coupled to a CPU bus 110 that transmits data signals between processor 101 and other components in the computer system 100.

The computer system 100 includes a memory 113. The memory 113 may be a dynamic random access memory device, a static random access memory device, read-only memory, or other memory device. The memory 113 may store instructions and code represented by data signals that may be executed by the processor 101. A bridge memory controller 111 is coupled to the CPU bus 110 and the memory 113. The bridge memory controller 111 directs data signals between the processor 101, the memory 113, and other components in the computer system 100 and bridges the data signals between the CPU bus 110, the memory 113, and a first IO bus 120. A cache memory 102 resides inside processor 101 that stores data signals stored in memory 113. The cache 102 speeds access to memory by the processor 101 by taking advantage of its locality of access. In an alternate embodiment of the computer system 100, the cache 102 resides external to the processor 101.

A cache management unit 103 resides in the processor 101 according to an exemplary embodiment of the present invention. The cache management unit 103 manages the cache 102 to prevent software side channel attacks. According to an embodiment of the computer system 100, the cache management unit 103 identifies a context switch. A context switch refers to when the processor 101 switches from executing one application to a second application. In one embodiment, each of the applications may be on a separate thread. The cache management unit 103 determines whether an application running requires protection. The cache management unit 103 may partition the cache 102 in response to determining that the application requires protection. According to one embodiment, partitioning a cache isolates one or more sections of a cache for thread allocation. The cache may be partitioned to include an even number of sections to allocate to threads supported by each logical processor. The cache management unit 103 may alternatively or in addition effectuate completely over writing a partitioned section of the cache or an entire un-partitioned cache completely with data associated with the application.

The first IO bus 120 may be a single bus or a combination of multiple buses. The first IO bus 120 provides communication links between components in the computer system 100. A network controller 121 is coupled to the first IO bus 120. The network controller 121 may link the computer system 100 to a network of computers (not shown) and supports communication among the machines. A display device controller 122 is coupled to the first IO bus 120. The display device controller 122 allows coupling of a display device (not shown) to the computer system 100 and acts as an interface between the display device and the computer system 100.

A second IO bus 130 may be a single bus or a combination of multiple buses. The second IO bus 130 provides communication links between components in the computer system 100. A data storage 131 is coupled to the second IO bus 130. The data storage 131 may be a hard disk drive, a floppy disk drive, a CD-ROM device, a flash memory device or other mass storage device. An input interface 132 is coupled to the second IO bus 130. The input interface 132 may be, for example, a keyboard and/or mouse controller or other input interface. The input interface 132 may be a dedicated device or can reside in another device such as a bus controller or other controller. The input interface 132 allows coupling of an input device to the computer system 100 and transmits data signals from an input device to the computer system 100. An audio controller 133 is coupled to the second IO bus 130. The audio controller 133 operates to coordinate the recording and playing of sounds and is also coupled to the IO bus 130. A bus bridge 123 couples the first IO bus 120 to the second IO bus 130. The bus bridge 123 operates to buffer and bridge data signals between the first IO bus 120 and the second IO bus 130.

Figure 2:
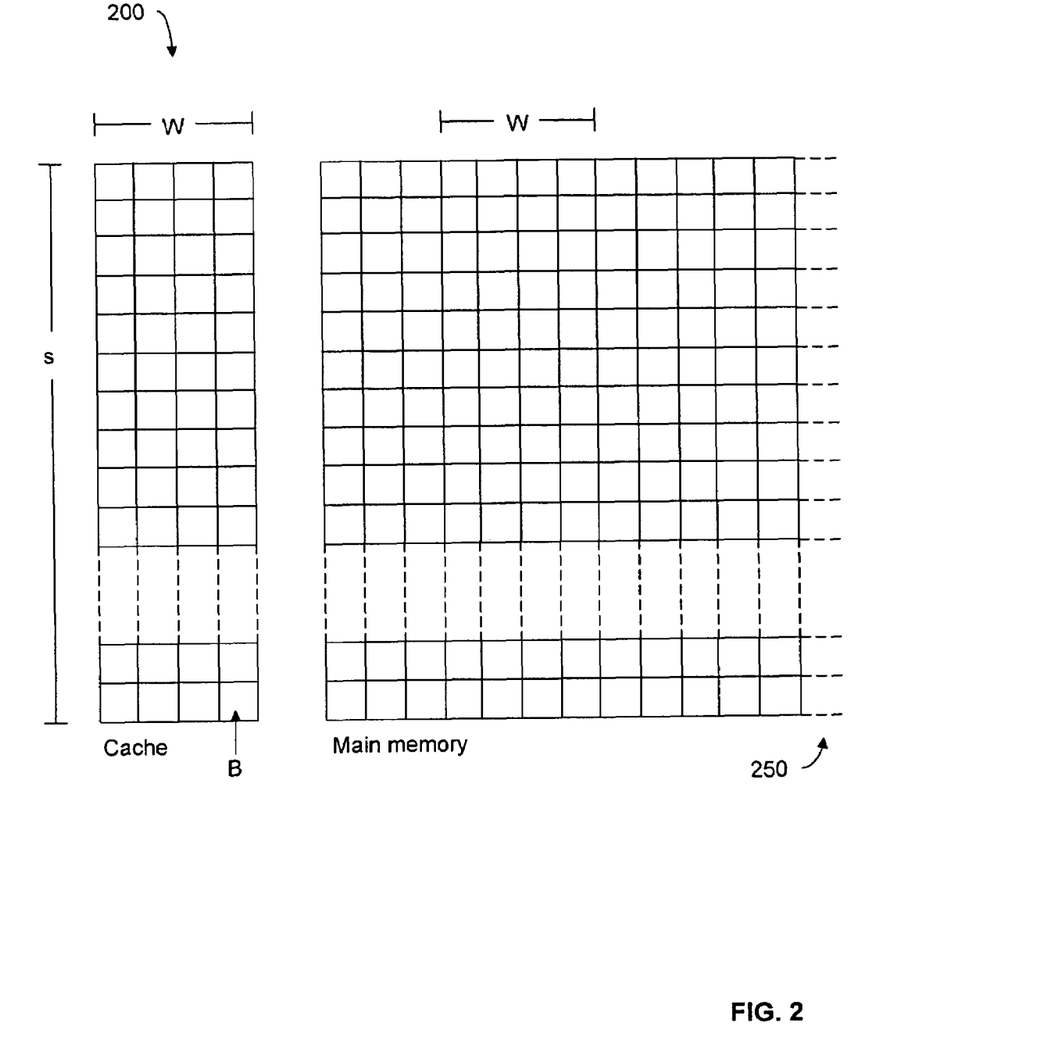
FIG. 2 illustrates a cache and memory according to an exemplary embodiment of the present invention.

FIG. 2 illustrates a cache 200 and memory 250 according to an embodiment of the present invention. The cache 200 may be used to represent the cache 102 (shown in FIG. 1) and the memory 250 may be used to represent the memory 113 (shown in FIG. 1). According to an embodiment of the present invention, the cache 200 is a set-associative memory cache. In this embodiment, cache 200 includes storage cells called cache lines, each having B bytes. The cache 200 is organized into S cache sets, each having W cache lines. The overall cache 200 includes S*W*B bytes. The cache 200 holds copies of aligned blocks of B bytes in memory 250 which may be referred to as memory blocks. According to one embodiment, the data in the cache may be the only valid copy of the data if a write is performed by a processor. When a cache miss occurs, a full memory block is copied into one of the cache lines. Each memory block may be cached only in a specific cache set. Specifically, the memory block starting at address a may be cached only in the W cache lines belonging to cache set [a/B] mod S. Thus, the memory blocks are partitioned in S classes, where the blocks in each class contend for the cache lines in a single cache set. It should be appreciated that other cache systems may also be used to implement the cache 102 and the memory 113.

Figure 3:
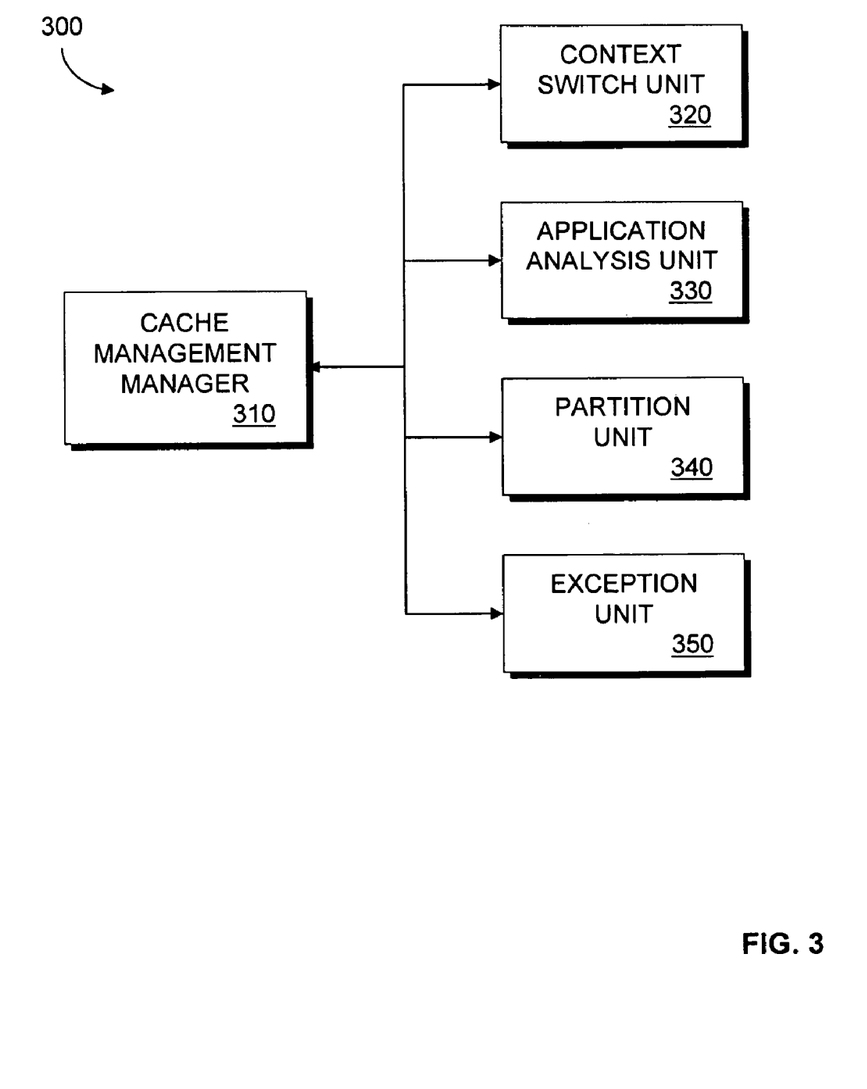
FIG. 3 is a block diagram of a cache management unit according to an exemplary embodiment of the present invention.

FIG. 3 is a block diagram of a cache management unit 300 according to an exemplary embodiment of the present invention. The cache management unit 300 may be implemented as the cache management unit 103 shown in FIG. 3. The cache management unit 300 includes a cache management manager 310. The cache management manager 310 is coupled to and transmits information between the components in the cache management unit 300.

The cache management unit 300 includes a context switch unit 320. The context switch unit 320 identifies a context switch when a processor is switching from running a first application to a second application. According to an embodiment of the cache management unit 300, the context switch unit 320 identifies a context switch by determining when a page table is being accessed. In one embodiment, the context switch unit 320 determines when a different page table is being accessed by detecting a write to a page table register in the processor such as the CR3 register in processors manufactured by Intel Corporation. The context switch unit 320 may identify a context switch by determining when a paging and protection modes are activated. In one embodiment, the context switch unit 320 determines when paging and protection modes are activated by detecting access to a paging and protection mode register in the processor such as the CR0 register in processors manufactured by Intel Corporation. The context switch unit 320 may identify a context switch by determining when extended data is being accessed. Extended data may include data associated with an application which was saved the last time the processor was running the application before a context switch. In one embodiment, the context switch unit 320 determines when extended data is being accessed by determining when a FXRSTOR instruction is being executed. It should be appreciated that the context switch unit 320 may identify a context switch using other procedures.

The cache management unit 300 includes an application analysis unit 330. The application analysis unit 330 determines whether an, application being run by the processor requires protection from side channel attacks. An application may require protection if it processes or accesses sensitive data. For example, a program that perform encryption/decryption or a program that manages electronic mail may be applications that require protection. The application analysis unit 330 may determine whether an application being run by the processor requires protection by accessing a page table entry associated with the application and reading a protection bit. If the protection bit is set, a determination may be made that the application requires protection. According to an embodiment of the present invention, the protection bit in the page table may be set directly by the application or by an operating system directed by the application.

The cache management unit 300 includes a partition unit 340. The partition unit 340 manages the cache among applications run by the processor. According to an embodiment of the cache management unit 300, the partition unit 340 may partition the cache in response to the application analysis unit 330 determining that an application being run by the processor after a context switch requires protection. By partitioning the cache, the cache management unit 300 allows a section of the cache to be isolated for the use of a single application and prevents other applications from detecting which of the lines in the cache have been displaced and determining values of sensitive data. It should be appreciated that the partition unit 340 may partition the cache using any appropriate partitioning technique. According to an embodiment of the cache management unit 300, the partition unit 340 may un-partition a cache or leave a cache un-partitioned in response to the application analysis unit 330 determining that an application run by processor after a context switch does not require protection.

The cache management unit 300 includes an exception unit 350. The exception unit 350 may generate an exception to prompt completely over writing a section of the cache with data associated with the application upon determining that the processor is beginning to run the application after a context switch. It should be appreciated that the section of the cache written to may be the entire cache. Alternatively, if the cache has been partitioned, the section of the cache written to may be a partitioned section of the cache. According to an embodiment of the cache management unit 300, the exception unit 350 prompts the over writing of the section of the cache with all the code associated with the application. The exception unit 350 may also prompt the over writing of the section of the cache with code from the application that has been identified as being sensitive in nature. Alternatively, the exception unit 350 may prompt the over writing of the section of the cache with a random subset of code from the application. It should be appreciated that the exception unit 350 may be prompting an exception handler to over write the cache. The exception handler may reside in the application or other location. By over writing the cache entirely with code/data associated with the application before the application has started or resumes execution, any information about the nature of the application's program flow based on data access patterns will be removed. By displacing all of the data previously written by a software side channel attack program from the cache and prefetching data to be used by the application in a fixed pattern, there is no information for the software side channel attack program to use.

The cache management unit 300 may partition a cache and/or prompt writing a section of the cache completely with data associated with the application after a context switch. This allows memory access patterns from an application to be made invisible to other applications and protects the data stored in the cache from snooping. The cache management unit 300 makes the access pattern invisible by prefetching some or all of the data before the application begins or resumes execution. According to one embodiment, the application does not generate any cache misses and the access pattern meta data is removed since both used and unused data are prefetched.

According to an embodiment of the present invention where the cache management unit 300 is implemented in hardware, the cache management manager 310, context switch unit 320, application analysis unit 330, partition unit 340, and exception unit 350 all reside on a single semiconductor substrate. It should be appreciated the cache management unit 300 or components of the cache management unit 300 may also be implemented in software, or a combination of hardware and software.

Figure 4:
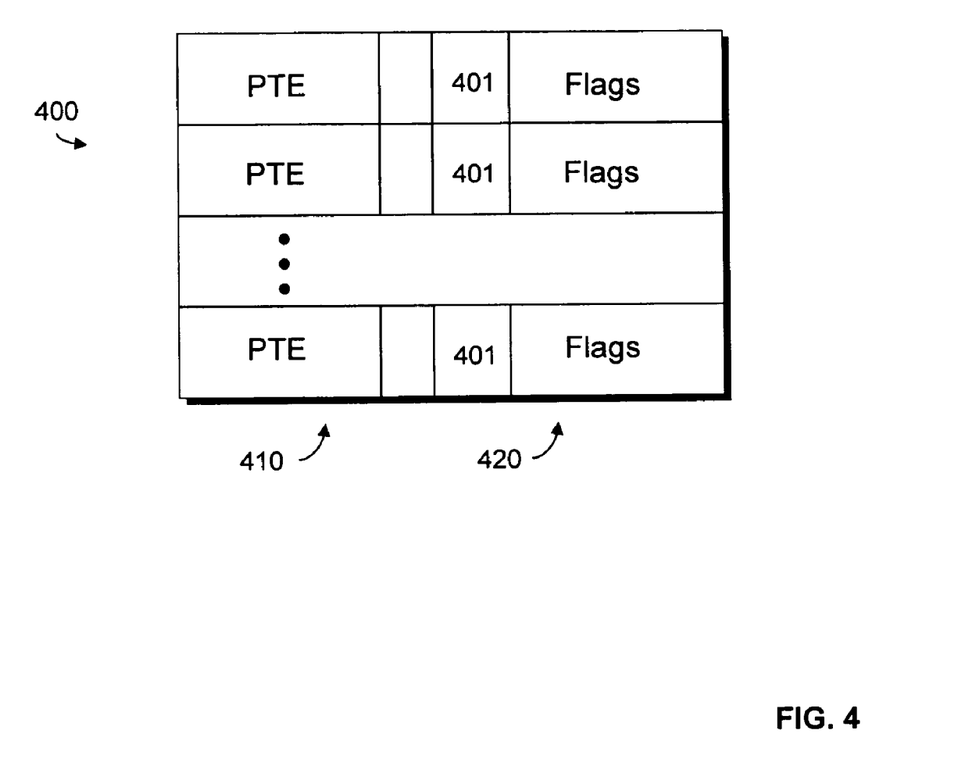
FIG. 4 is a block diagram of a page table according to an exemplary embodiment of the present invention.

FIG. 4 is a block diagram of a page table 400 according to an exemplary embodiment of the present invention. The page table 400 includes a first section 410 for storing a plurality of page table entries (PTEs). The page table entries may include virtual addresses to physical addresses mapping. The page table 400 includes a second section 420 for storing flags and other information about the page. According to an embodiment of the page table 400, the second section 420 may include one or more bits that may be set for indicating a state or status of a page table entry. In this embodiment, one of the bits 401 may be designated as a protection bit to indicate that an application associated with the address is to be protected.

It should be appreciated that the page table 400 may be implemented using one or more directories and/or tables and that the mapping a virtual address to a physical address may involve translating an address though a number of intermediate layers. For example, a virtual address may be in the form of a guest linear address. The guest linear address may be translated to a guest physical address before being translated to a host physical address, which is the physical address. According to an embodiment of the present invention, the page table 400 may reside in a processor. It should be appreciated that the page table may be implemented on other components in a computer system.

Figure 5:
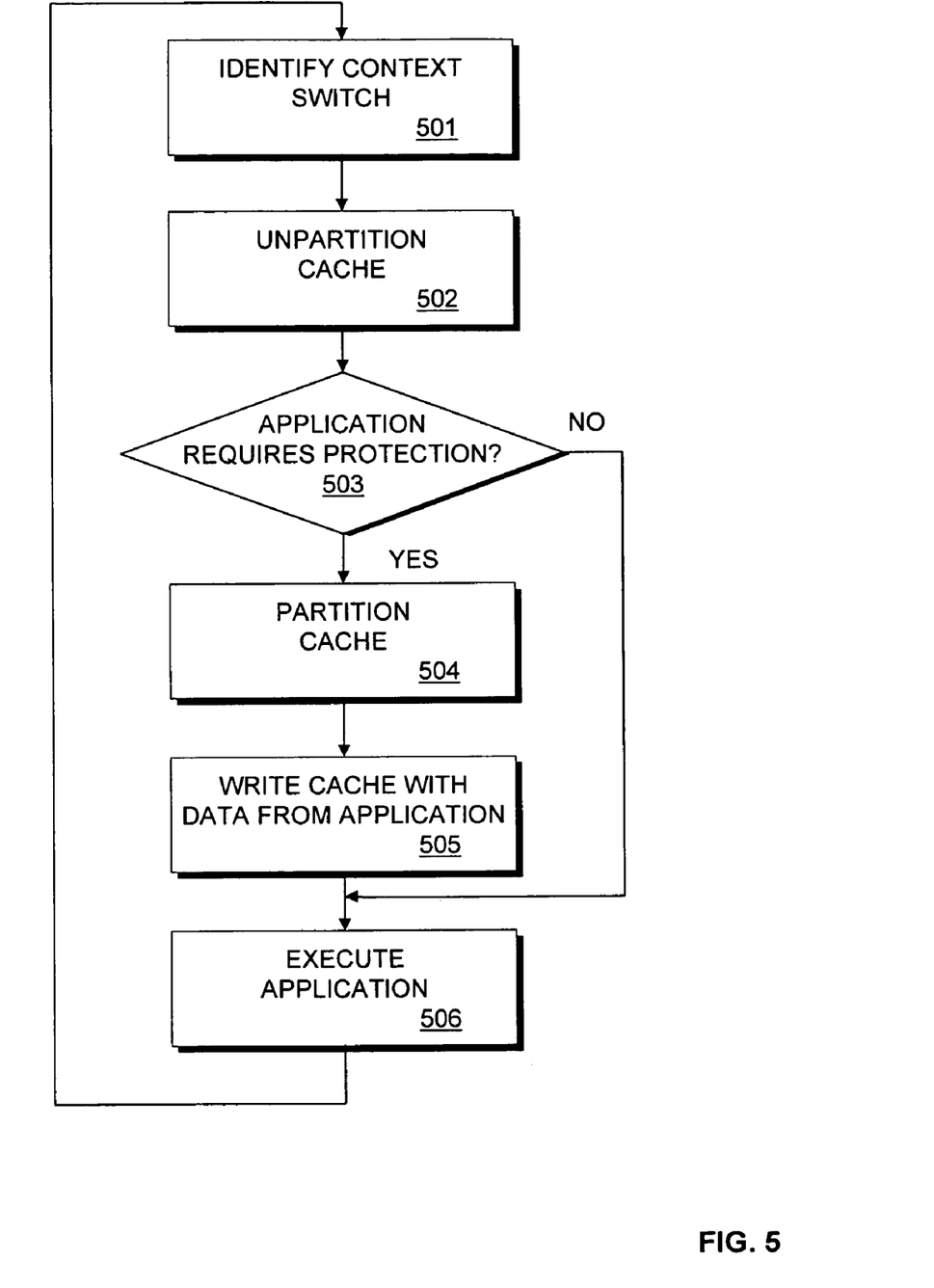
FIG. 5 is a flow chart illustrating a method for managing a cache according to an exemplary embodiment of the present invention.

FIG. 5 is a flow chart illustrating a method for managing a cache according to an exemplary embodiment of the present invention. At 501, a context switch is identified. According to an embodiment of the present invention, a context switch occurs when a processor switches from executing a first application to a second application.

At 502, the cache is un-partitioned. According to an embodiment of the present invention, if the cache is already un-partitioned, it is left in the un-partitioned state.

At 503, it is determined whether the application requires protection. According to an embodiment of the present invention, a page table entry corresponding to the application is checked for its protection bit when the program begins or resumes execution. If the protection bit is active, it is determined that the application requires protection and control proceeds to 504. If the protection bit is inactive, it is determined that the application does not require protection and control proceeds to 506.

At 504, the cache is partitioned. Partitioning a cache allows a section of the cache to be isolated for the use of a single application and prevents other applications from detecting which of the lines in the cache have been displaced and determining values of sensitive data. It should be appreciated that the cache may be partitioned using any appropriate partitioning technique.

At 505, a partitioned section of the cache corresponding to the application is completely over written with data. According to an embodiment of the present invention, all of the code or data associated with the application is written into the partitioned section of the cache. Alternatively, data from the application that has been identified as being sensitive in nature may be written into the partitioned section of the cache. Alternatively, a random subset of code or data from the application may be written into the partitioned section of the cache.

According to an embodiment of the present invention, the cache is not partitioned at 504. In this embodiment, the entire cache instead of just a partitioned section of the cache is over written with data as described at 505. According to an embodiment of the present invention, the partitioned section of the cache is not over written with data as described at 505. In this embodiment, control proceeds to 506 from 504.

At 506, the application is allowed to be executed. Control returns to 501 to identify a context switch.

It should be appreciated that a context switch may also include switching between execution of software threads within a same application. According to an embodiment of the present invention, the procedures described with reference to FIG. 5 may be modified to include determining whether a software thread requires protection at 503, partitioning a cache to be isolated for the use of a single software thread at 504, and completely overwriting the section of cache used for the software thread at 505.

Figure 6:
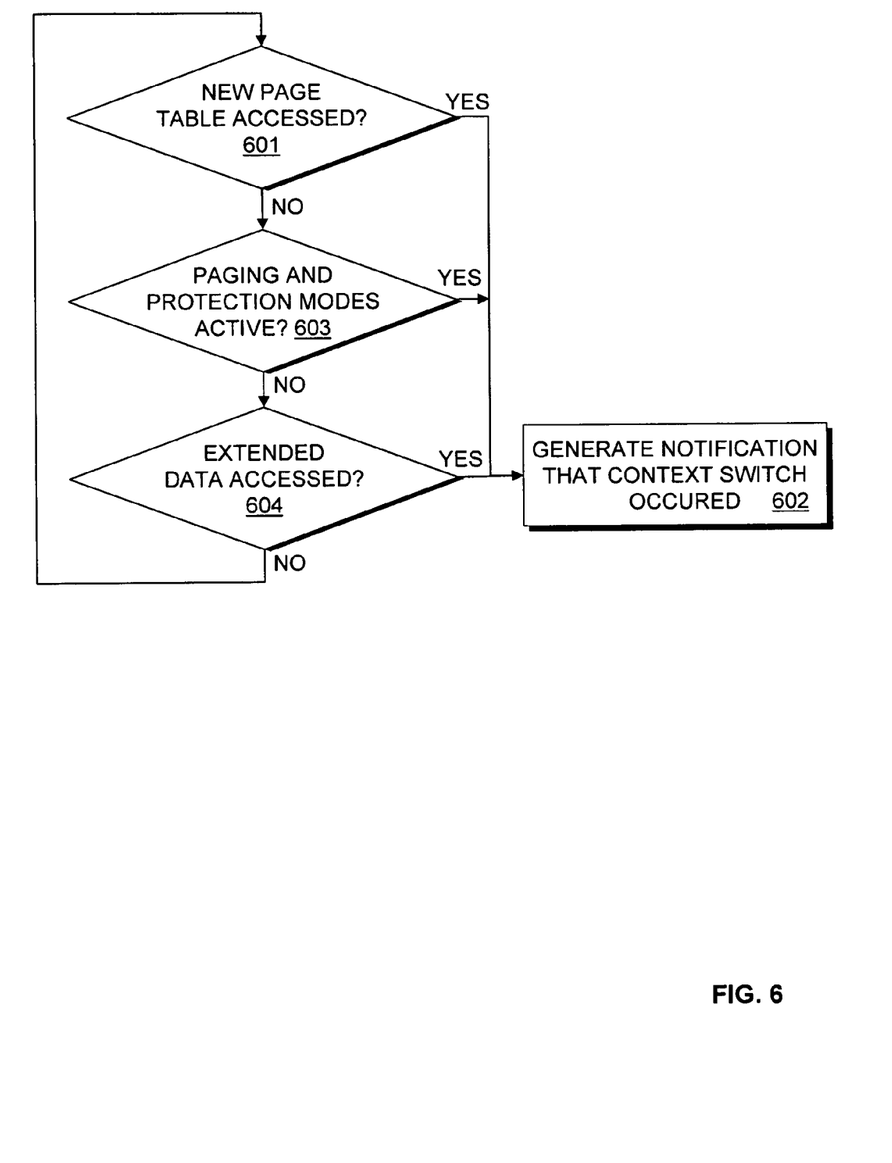
FIG. 6 is a flow chart illustrating a method for determining a context switch according to an exemplary embodiment of the present invention.

FIG. 6 is a flow chart illustrating a method for determining a context switch according to an exemplary embodiment of the present invention. At 601, it is determined whether a new page table is being accessed. According to one embodiment, determining when a page table is being accessed is achieved by detecting a write to a page table register such as the CR3 register in processors manufactured by Intel Corporation. If it is determined that a new page table is being accessed, control proceeds to 602. If it is determined that the page table is not being accessed, control proceeds to 603.

At 602, a notification is generated to indicate that a context switch has occurred.

At 603, it is determined whether paging and protection modes are activated. According to one embodiment, determining when paging and protection modes are activated is achieved by detecting access to a paging and protection mode register in the processor such as the CR0 register in processors manufactured by Intel Corporation. If it is determined that paging and protection modes are activated, control proceeds to 602. If it is determined that paging and protection modes are not activated, control proceeds to 604.

At 604, it is determined whether extended data is being accessed. According to one embodiment, determining whether extended data is being accessed is achieved by determining when a FXRSTOR instruction is being executed. If it is determined that extended data is being accessed, control proceeds to 602. If it is determined that extended data is not being accessed, control returns to 601.

FIGS. 5 and 6 are flow charts illustrating methods according to exemplary embodiments of the present invention. Some of the techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for managing a cache, comprising:
   identifying a context switch;
   determining whether an application running after the context switch requires protection;
   partitioning the cache in response to determining that the application requires protection; and
   executing the application without partitioning the cache in response to determining that the application does not require protection.

2. The method of claim 1, further comprising completely over writing a partitioned section of the cache with data associated with the application prior to an execution of the application.

3. The method of claim 2, wherein completely over writing the partitioned section of the cache with data associated with the application comprises writing all the code associated with the application into the partitioned section of the cache.

4. The method of claim 2, wherein completely over writing the partitioned section of the cache with data associated with the application comprises writing code from the application that has been identified as being sensitive in nature into the partitioned section of the cache.

5. The method of claim 2, wherein completely over writing the partitioned section of the cache with data associated with the application comprises randomly writing a subset of code from the application into the partitioned section of the cache.

6. The method of claim 1, wherein identifying the context switch comprises determining when a new page table is being accessed.

7. The method of claim 1, wherein identifying the context switch comprises determining when a write to page table register is being written to.

8. The method of claim 1, wherein identifying the context switch comprises determining when paging and protection modes are activated.

9. The method of claim 1, wherein identifying the context switch comprises determining when a paging and protection mode register is being accessed.

10. The method of claim 1, wherein identifying the context switch comprises determining when extended data is being accessed.

11. The method of claim 1, wherein identifying the context switch comprises determining when a FXRSTOR instruction is being executed.

12. The method of claim 1, wherein determining whether an application running requires protection comprises determining whether a protection bit in a page table entry associated with the application is set.

13. A machine accessible storage medium including sequences of instructions, the sequences of instructions including instructions which when executed cause the machine to perform:
   identifying a context switch;
   determining whether an application running after the context switch requires protection;
   partitioning the cache in response to determining that the application requires protection; and
   executing the application without partitioning the cache in response to determining that the application does not require protection.

14. The machine accessible storage medium of claim 13, further comprising instructions which when executed causes the processor to further perform completely over writing a partitioned section of the cache with data associated with the application prior to an execution of the application.

15. The machine accessible storage medium of claim 13, wherein identifying the context switch comprises determining when a new page table is being accessed.

16. A cache management unit implemented in hardware, comprising:
   a context switch unit to identify a context switch;
   an application analysis unit to determine whether an application requires protection; and a partition unit to partition a cache upon determining that the application requires protection and to leave the cache unpartitioned to allow the application to execute in the unpartitioned cache in response to determining that the application does not require protection.

17. The cache management unit of claim 16, further comprising an exception unit to generate an exception to prompt completely over writing a partitioned section of the cache with data associated with the application prior to an execution of the application.

18. The cache management unit of claim 16, wherein the context switch unit determines when a new page table is being accessed.

19. The cache management unit of claim 16, wherein the context switch unit determines when paging and protection modes are activated.

20. The cache management unit of claim 16, wherein the context switch unit determines when extended data is being accessed.

21. A computer system, comprising:
 a processor;
 a cache; and
 a cache management unit that includes a context switch unit to identify a context switch, an application analysis unit to determine whether an application requires protection, and a partition unit to partition a cache upon determining that the application requires protection and to leave the cache unpartitioned to allow the application to execute in the unpartitioned cache in response to determining that the application does not require protection.

* * * * *